H. W. ROMANOFF.
VEHICLE.
APPLICATION FILED JAN. 15, 1918.
1,306,080.
Patented June 10, 1919.
2 SHEETS—SHEET 1.
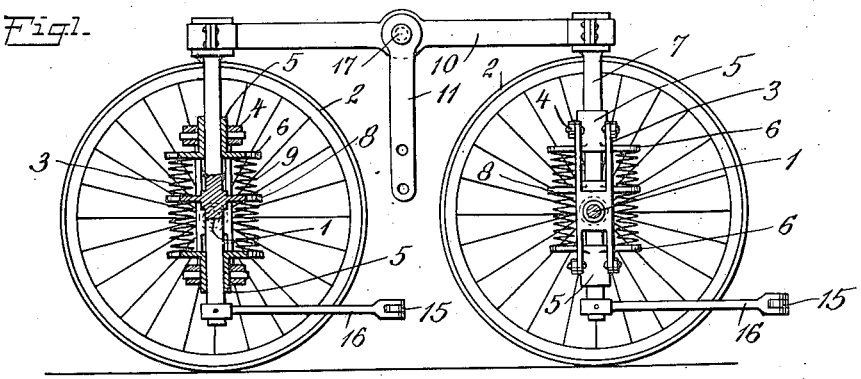
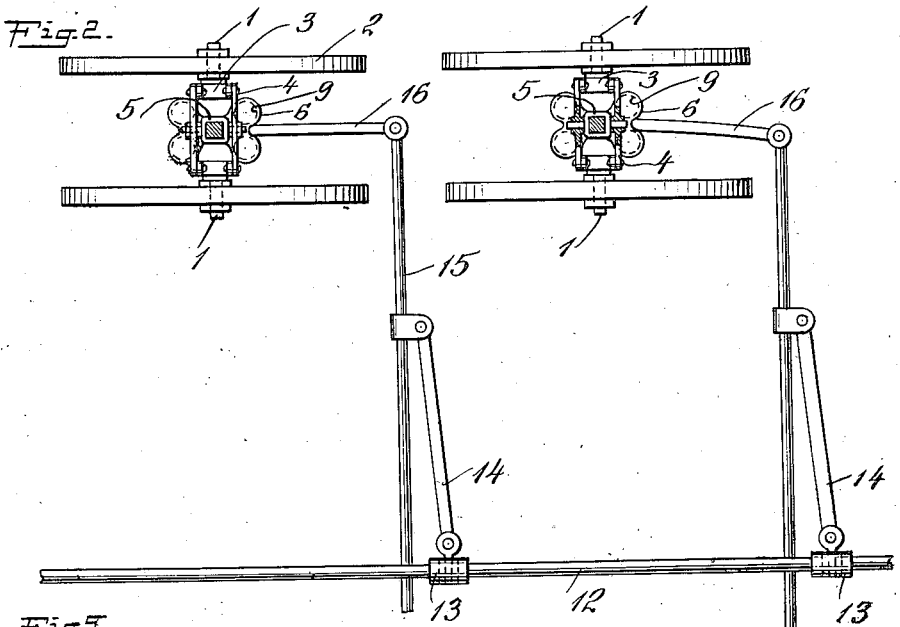
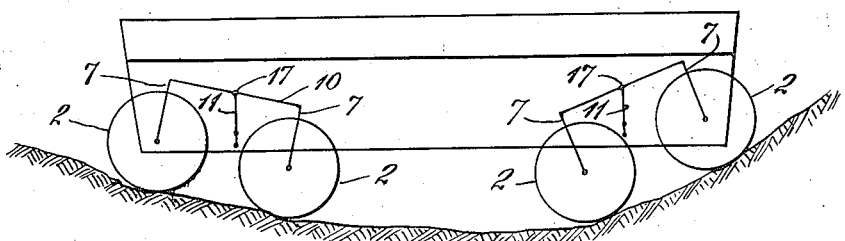
INVENTOR
*Hippolyte W. Romanoff*
BY
*Pennie, Davis, Marvin & Edmonds*
ATTORNEYS.

H. W. ROMANOFF.
VEHICLE.
APPLICATION FILED JAN. 15, 1918.
1,306,080.
Patented June 10, 1919.
2 SHEETS—SHEET 2.
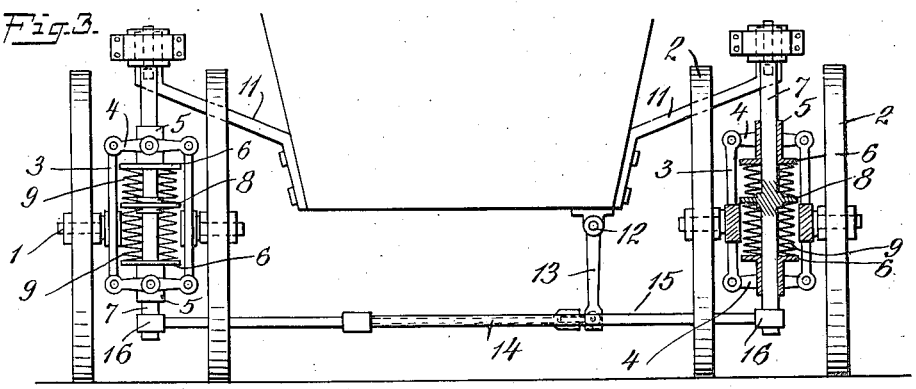
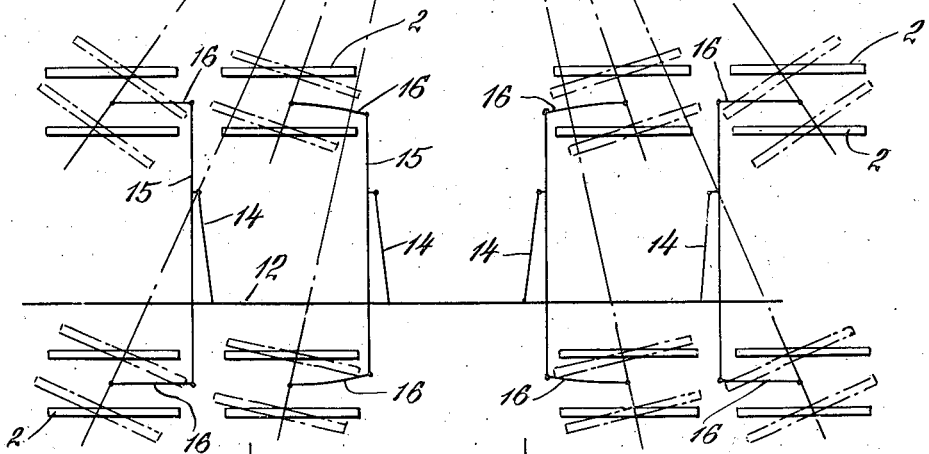
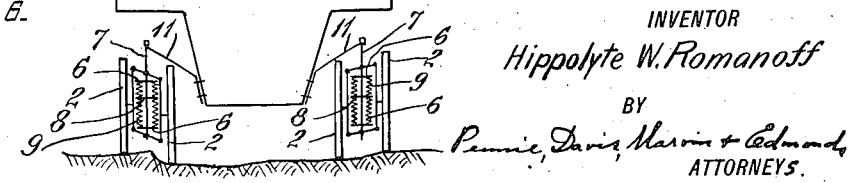
INVENTOR
Hippolyte W. Romanoff
BY
Pennie, Davis, Marvin & Edmonds
ATTORNEYS.

UNITED STATES PATENT OFFICE.

HIPPOLYTE W. ROMANOFF, OF NEW YORK, N. Y.

VEHICLE.

1,306,080.   Specification of Letters Patent.   Patented June 10, 1919.

Application filed January 15, 1918. Serial No. 211,946.

*To all whom it may concern:*

Be it known that I, HIPPOLYTE W. ROMANOFF, a citizen of Russia, residing at Biltmore Hotel, New York city, in the county of New York, State of New York, have invented certain new and useful Improvements in Vehicles; and I do hereby declare the following to be a full, clear, and exact description of the invention, such as will enable others skilled in the art to which it appertains to make and use the same.

The object of my invention is to provide a doubled set of wheels for multiple-wheel vehicles. The essential features of my arrangement chiefly consist in the method of suspending elastically the vehicle body or frame on wheels, which is realized by means of a series of helical springs and of a parallelogram system enabling the wheels of the same one pair to be displaced at different heights according to the unevenness of the transverse profile of the road, with preservance of a constant parallelism between these wheels. Owing to the symmetrical arrangement of the parallelogram in respect to the plane in which the body is supported, the shock, acting upon one of the wheels of the pair, is assumed by the other wheel, serving then here as a bearing for the absorption of the shock, and transmitted to the vehicle body through the springs with a two times weakened force.

In the annexed drawing, Figure 1 represents a side view of the doubled set of wheels; Fig. 2 is a diagrammatical plan view showing some parts in section; Fig. 3 is a front view and partly sectional elevation; Fig. 4 is a diagram illustrating the operation of two sets of wheels of the vehicle; Fig. 5 is a diagram illustrating the positions assumed by the wheels when running on a road with uneven longitudinal profile; Fig. 6 is a similar view, showing the shifting of the coupled wheels produced by unevenness of the transverse profile of the road.

The short axles 1 of the coupled wheels 2 are integral with or rigidly secured to the vertical links 3, forming the two sides of a parallelogram, the two other sides 4 of which are pivoted on the journals of the square sectional lugs 5 formed by the plates 6. These latter can loosely slide on the vertical rod 7 of the same section, having inside the parallelogram a boss 8, the shape of which in plan corresponds to that of the plates 6. Between this boss and both the plates 6 the helical springs 9 are located, there being four of them in the construction represented in the drawing by way of example. The rods 7 of the two wheel pairs of the same one side of the set of wheels are rigidly fastened to the horizontal bar 10, to which the vehicle body is pivotally secured, for instance on the link 11.

For turning the two pairs of coupled wheels 2 together, the following arrangement is provided: Nearly in the central plane of the vehicle there is a longitudinal shaft 12 on which are fixed the arms 13 which are connected by the rod 14, provided at the ends with universal or ball joints, to the horizontally movable bar 15, articulated at the ends by similar joints with the arm 16, rigidly secured to the lower ends of the rods 7.

When running on a road with an uneven longitudinal profile the set of wheels turn as a whole on the joints 17 (Fig. 5). When running on an uneven transverse profile each of the two coupled wheels can change its vertical position relatively to each other, both wheels preserving a vertical position as the links 3 remain always vertical at the shifting of the links 4 and the travel of the plates 5, 6 on the vertical rods 7 (Fig. 6). In all cases the shocks are absorbed by the helical springs 9. It is also obvious that when the shock is acting for instance upon the outer wheel, the inner wheel coupled with it serves as a bearing for receiving this shock, which, owing to the given method of suspension of the body to the parallelogram is transmitted to such body doubly weakened.

The steering of the vehicle is performed by turning the longitudinal shaft 12, which, acting on the joint systems 13, 14, 15, 16, causes the coupled wheels to turn (Fig. 4). The arrangement is such that the angle of turning of the end wheel pairs of each set is larger than that for the inner pairs, as is shown in Fig. 4. Such an arrangement allows the vehicle to inscribe itself into curves of a very small radius.

Claims:

1. A vehicle provided with a plurality of wheels arranged in pairs on each side of the vehicle, the wheels of each pair being so connected to each other that both wheels will remain substantially vertical when on an inclined surface, and the pairs of wheels on each side of the vehicle being connected together in pairs; substantially as described.

2. A vehicle provided with a plurality of wheels arranged in pairs on each side of the vehicle, the wheels of each pair being so connected to each other that both wheels will remain substantially vertical when on an inclined surface, and connections between the corresponding pairs of wheels on opposite sides of the vehicle whereby they may be turned in unison to alter the course of the vehicle.

3. A vehicle provided with a plurality of wheels arranged in pairs on each side of the vehicle, the wheels of each pair being so connected to each other that both wheels will remain substantially vertical when on an inclined surface, and the pairs of wheels on each side of the vehicle being connected together in pairs, and a vehicle support between the connected pairs at each end of the vehicle.

4. A vehicle provided with a plurality of wheels arranged in pairs on each side of the vehicle, a member to which the axle of each wheel of a pair is connected, a supporting member associated with each pair of wheels, members slidably mounted on the supporting member, members pivoted to said slidable member and to the members to which the axles are connected, and spring connections between said supporting member and the slidable members mounted thereon.

5. A vehicle provided with a plurality of wheels arranged in pairs on each side of the vehicle, a member to which the axle of each wheel of a pair is connected, a supporting member associated with each pair of wheels, members slidably mounted on the supporting member, members pivoted to said slidable member and to the members to which the axles are connected, spring connections between said supporting member and the slidable members mounted thereon, and connections between the supporting members of corresponding pairs of wheels on opposite sides of the vehicle, whereby the corresponding pairs of wheels may be turned in unison to alter the course of the vehicle.

6. A vehicle provided with a plurality of wheels arranged in pairs on each side of the vehicle, a member to which the axle of each wheel of a pair is connected, a supporting member associated with each pair of wheels, members slidably mounted on the supporting member, members pivoted to said slidable member and to the members to which the axles are connected, spring connections between said supporting member and the slidable members mounted thereon, connections between the supporting members of two pairs of wheels on each side of the vehicle, and a vehicle support pivoted to said connections.

7. A vehicle provided with a plurality of wheels arranged in pairs on each side of the vehicle, substantially vertical members to which the axles of the wheels of each pair are connected, a substantially vertical supporting member, between the other vertical members of each pair and provided with an extended portion, a pair of slidable members on the supporting member, springs between each of the slidable members and the extended portion of the supporting member, and transverse members pivoted to the slidable members and to the ends of the vertical members.

8. A vehicle provided with a plurality of wheels arranged in pairs on each side of the vehicle, substantially vertical members to which the axles of the wheels of each pair are connected, a substantially vertical supporting member, between the other vertical members of each pair and provided with an extended portion, a pair of slidable members on the supporting member, springs between each of the slidable members and the extended portion of the supporting member, transverse members pivoted to the slidable members and to the ends of the vertical members, connections between the lower ends of the vertical supporting members of corresponding pairs of wheels on opposite sides of the vehicle, and horizontal supporting members connecting in pairs the upper ends of the pairs of wheels on each side of the vehicle.

9. A vehicle provided with a plurality of wheels arranged in pairs on each side of the vehicle, substantially vertical members to which the axles of the wheels of each pair are connected, a substantially vertical supporting member between the other vertical members of each pair and provided with an extended portion, a pair of slidable members on the supporting member, springs between each of the slidable members and the extended portion of the supporting member, transverse members pivoted to the slidable members and to the ends of the vertical members, connections between the lower ends of the vertical supporting members of corresponding pairs of wheels on opposite sides of the vehicle, horizontal supporting members connecting in pairs the upper ends of the pairs of wheels on each side of the vehicle, and vehicle supporting members on each side of the vehicle, each of said members being pivoted at its ends to the horizontal supporting members on the same side of the vehicle.

In testimony whereof I affix my signature.

HIPPOLYTE W. ROMANOFF.